(12) United States Patent
Ay et al.

(10) Patent No.: US 12,015,148 B2
(45) Date of Patent: Jun. 18, 2024

(54) SILICON PARTICLES FOR ANODE MATERIALS OF LITHIUM ION BATTERIES

(71) Applicant: WACKER CHEMIE AG, Munich (DE)

(72) Inventors: Sefer Ay, Munich (DE); Dominik Jantke, Burghausen (DE); Jürgen Stohrer, Pullach (DE); Sebastian Suckow, Burghausen (DE); Harald Voit, Reischach (DE)

(73) Assignee: WACKER CHEMIE AG, Munich (DE)

( * ) Notice: Subject to any disclaimer, the term of this patent is extended or adjusted under 35 U.S.C. 154(b) by 398 days.

(21) Appl. No.: 16/484,822

(22) PCT Filed: Feb. 9, 2017

(86) PCT No.: PCT/EP2017/052883
§ 371 (c)(1),
(2) Date: Aug. 8, 2019

(87) PCT Pub. No.: WO2018/145750
PCT Pub. Date: Aug. 16, 2018

(65) Prior Publication Data
US 2020/0028164 A1 Jan. 23, 2020

(51) Int. Cl.
*H01M 4/38* (2006.01)
*H01M 4/134* (2010.01)
(Continued)

(52) U.S. Cl.
CPC ........... *H01M 4/386* (2013.01); *H01M 4/134* (2013.01); *H01M 4/366* (2013.01); *H01M 4/587* (2013.01);
(Continued)

(58) Field of Classification Search
CPC ...... H01M 4/386; H01M 4/134; H01M 4/366; H01M 4/625; H01M 4/587; H01M 10/0525
See application file for complete search history.

(56) References Cited

U.S. PATENT DOCUMENTS

| 5,128,116 A | 7/1992 | Forwald et al. |
| 5,469,020 A | 11/1995 | Herrick |

(Continued)

FOREIGN PATENT DOCUMENTS

| DE | 102015215415 A1 | 2/2017 |
| DE | 102016202459 A1 | 8/2017 |

(Continued)

OTHER PUBLICATIONS

Lebrun (Jean-Marie Lebrun, "Investigation of Oxidation and Sintering mechanisms of Silicon powders for photovoltaïc applications" in Material chemistry, Institut National Polytechnique de Grenoble—INPG, 2012) (Year: 2013).*

(Continued)

*Primary Examiner* — Jeremiah R Smith
(74) *Attorney, Agent, or Firm* — BROOKS KUSHMAN P.C.

(57) ABSTRACT

The invention relates to spherical, nonporous Silicon particles having average particle sizes ($d_{50}$) of 1 to 10 pm and a silicon content of 97 to 99.8 wt. %, the silicon content relating to the total weight of the silicon particles minus any oxygen content.

20 Claims, 1 Drawing Sheet

Figure 1:
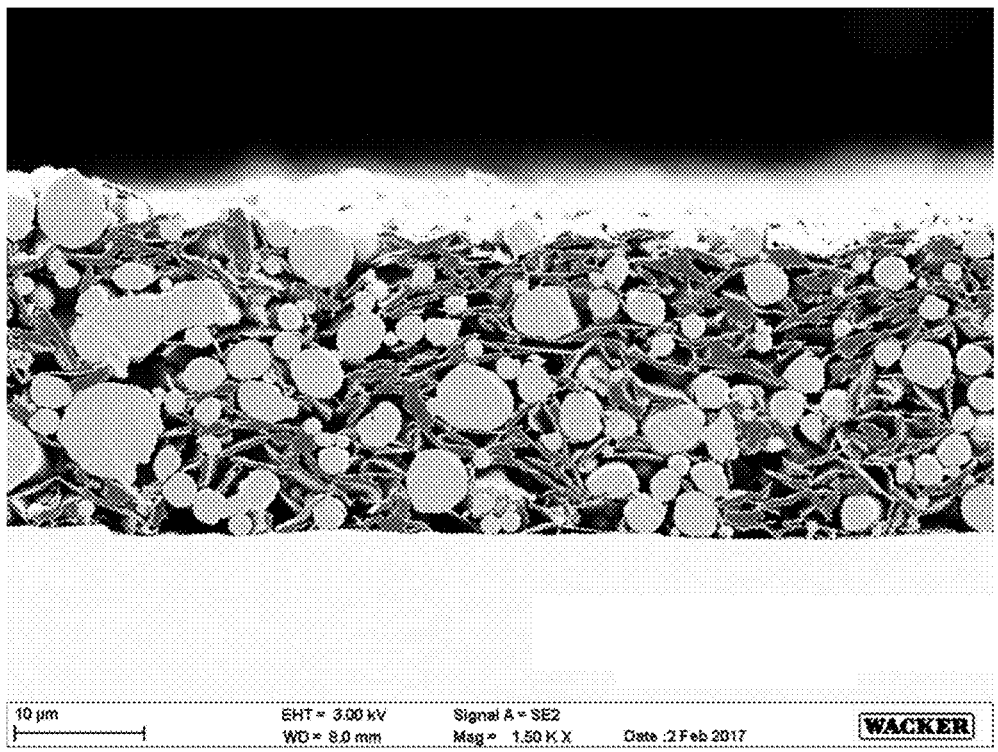

(51) Int. Cl.
| | |
|---|---|
| H01M 4/36 | (2006.01) |
| H01M 4/587 | (2010.01) |
| H01M 4/62 | (2006.01) |
| H01M 10/0525 | (2010.01) |
| H01M 4/02 | (2006.01) |

(52) U.S. Cl.
CPC ....... *H01M 4/625* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 7,097,688 B1 | 8/2006 | Mohla et al. |
| 9,692,044 B2 | 6/2017 | Delpuech et al. |
| 2003/0235762 A1 | 12/2003 | Fukui et al. |
| 2004/0004301 A1 | 1/2004 | Singh et al. |
| 2004/0166319 A1* | 8/2004 | Li .................. C01B 33/02 428/404 |
| 2004/0214085 A1 | 10/2004 | Sheem et al. |
| 2005/0135986 A1* | 6/2005 | Weidhaus .......... C01B 33/027 423/348 |
| 2010/0124707 A1 | 5/2010 | Hirose et al. |
| 2011/0206842 A1 | 8/2011 | Revankar et al. |
| 2013/0095324 A1 | 4/2013 | Inokuchi |
| 2014/0225030 A1 | 8/2014 | Dehtiar et al. |
| 2014/0332717 A1* | 11/2014 | Paireau ............. H01M 4/362 252/182.1 |
| 2016/0049652 A1 | 2/2016 | Elhassid et al. |
| 2017/0040610 A1* | 2/2017 | Otsuka ............... H01M 4/366 |
| 2018/0034056 A1* | 2/2018 | Cho .................... H01M 4/386 |
| 2018/0212234 A1 | 7/2018 | Haufe |
| 2018/0226640 A1* | 8/2018 | Choi ................... H01M 4/366 |
| 2018/0342732 A1 | 11/2018 | Troegel et al. |
| 2020/0028164 A1 | 1/2020 | Ay et al. |

FOREIGN PATENT DOCUMENTS

| | | |
|---|---|---|
| EP | 0727678 B1 | 3/2003 |
| EP | 2150998 B1 | 10/2018 |
| EP | 3580796 B1 | 12/2020 |
| JP | 10182125 A | 7/1998 |
| JP | 11335254 A2 | 12/1999 |
| JP | 2005219971 A | 8/2005 |
| WO | 9105723 A1 | 5/1991 |

OTHER PUBLICATIONS

Liu ("Synthesis of Silicon Microspheres", Materials Science Forum, vol. 848, Trans Tech Publications, Ltd., Mar. 2016, pp. 505-518) (Year: 2016).*
Fenollosa ("Silicon Colloids: From Microcavities to Photonic Sponges", Adv. Mater. 2008, 20, 95-98) (Year: 2008).*
Stober et al.: Controlled growth of monodisperse silica spheres in the micron size range, Journal of Colloid and Interface Science, Jan. 1, 1968 Academic Press, Inc, US—ISSN 0021-9797, vol. 26, Nr: 1, pp. 62-69, XP024189444.
Strobel et al.: Flame aerosol synthesis of smart nanostructured materials, Journal of Materials Chemistry, Sep. 25, 2007 Royal Society of Chemistry, GB—ISSN 0959-9428, vol. 17, pp. 4743-4756, XP002540713.
Girshick et al.: Homogeneous nucleation of particles from the vapor phase in thermal plasma synthesis, Plasma Chemistry and Plasma Processing, Sep. 1, 1989 Plenum Press. New York, US—ISSN 0272-4324, vol. 9, Nr:3, pp. 355-369, XP055378580.
See-How Ng et al.: Highly Reversible Lithium Storage in Spheroidal Carbon-Coated Silicon Nanocomposites as Anodes for Lithium-Ion Batteries, Angewandte Chemie, International Edition, Oct. 20, 2006 Wiley-VCH, DE—ISSN 1433-7851, vol. 45, Nr:41, pp. 6896-6899, XP055377992.

Yan Yao et al.: Interconnected Silicon Hollow Nanospheres for Lithium-Ion Battery Anodes with Long Cycle Life, Nano Letters, Jul. 13, 2011 American Chemical Society—ISSN 1530-6984, vol. 11, Nr:7, pp. 2949-2954, XP055046276.
Zailei Zhang et al.: Amorphous silicon-carbon nanospheres synthesized by chemical vapor deposition using cheap methyltrichlorosilane as improved anode materials for Li-ion batteries, Nanoscale, Jan. 1, 2013 Royal Society of Chemistry, United Kingdom, vol. 5,Nr: 12,p. 5384, XP055378890.
Magasinski et al.: High-performance lithium-ion anodes using a hierarchical bottom-up approach, Nature Materials, Apr. 1, 2010 Nature Pub. Group, vol. 9,Nr:4,pp. 353-358, XP055024468.
Ge M et al.: Review of porous silicon preparation and its application for lithium-ion battery anodes, Nanotechnology, Sep. 25, 2013 IOP, Bristol, GB, vol. 24,Nr:42,p. 422001, XP020252093.
Matthew T Mcdowell at al .: 25th Anniversary Article: Understanding the Lithiation of Silicon and Other Alloying Anodes for Lithium-Ion Batteries, Advanced Materials, Sep. 22, 2013 Wiley-VCH Germany, DE—ISSN 0935-9648, vol. 25, Nr:36, pp. 4966-4985, XP055378128.
Mingyuan Ge et al.: Porous Doped Silicon Nanowires for Lithium Ion Battery Anode with Long Cycle Life, Nano Letters, May 9, 2012 American Chemical Society, US, vol. 12,Nr:5,pp. 2318-2323, XP055378882.
Wei Sun et al.: A long-life nano-silicon anode for lithium ion batteries: supporting of graphene nanosheets exfoliated from expanded graphite by plasma-assisted milling, Electrochimica Acta, Jan. 1, 2016 Elsevier Science Publishers, Barking, GB, vol. 187,pp. 1-10, XP055378129.
Ran Yi et al.: Integrating Si nanoscale building blocks into micro-sized materials to enable practical applications in lithium-ion batteries, Nanoscale, Jan. 1, 2016 Royal Society of Chemistry, United Kingdom, vol. 8,Nr:4,pp. 1834-1848, XP055378370.
Wen Wei Lee et al.: Novel synthesis of high performance anode materials for lithium-ion batteries (LIBs), Journal of Materials Chemistry A, Jan. 1, 2014 Royal Society of Chemistry, GB, vol. 2,Nr:6,pp. 1589-1626, XP055378374.
Karthikeyan J et al.: Plasma spray synthesis of nanomaterial powders and deposits, Materials Science and Engineering: A, Jan. 1, 1997 Elsevier, Amsterdam, NL—ISSN 0921-5093, vol. 238, Nr:2, pp. 275-286, XP002250516.
Ping Wu et al.: Three-Dimensional Interconnected Network of Graphene-Wrapped Porous Silicon Spheres: In Situ Magnesiothermic-Reduction Synthesis and Enhanced Lithium-Storage Capabilities, ACS applied materials & interfaces, Mar. 12, 2014 ACS American Chemical Society, US—ISSN 1944-8244, vol. 6, Nr:5, pp. 3546-3552, XP055379703.
Neikov et al., "Handbook of Non-Ferrous Metal Powders" Chapter 5: Atomization and Granulation Elsevier Science, 2009 ISBN: 978-1-85617-422-0.
Rodrigues et al., "Inert Gas Atomization of Chemical Grade Silicon" Key Eng. Mater., 189-191 (2001) 276-281, Feb. 2001.
Cui et al., "Inorganic Glue Enabling High Performance of Silicon Particles as Lithium Ion Battery Anode" Journal of the Electrochemical Society, 158 (5) A592-A596 (2011), Mar. 28, 2011.
Kutik and Renken, EPI Information, Mar. 2019 "Who bears the burden to show that an objective technical problem has been credibly solved?" pp. 17-20.
Zhang et al., "High-Columbic-Efficiency Lithium Battery Based on Silicon Particle Materials", Nanoscale Research Letters (2015) 10:395, Oct. 8, 2015.
Lee et al., "Spherical silicon/graphite/carbon composites as anode material for lithium-ion batteries", Journal of Power Sources 176 (2008) 353-358, Oct. 18, 2007.
Lu at al., "Controllable synthesis of spherical silicon and its performance as an anode for lithium-ion batteries", Ionics (2013) 19:1695-1698, Sep. 29, 2013.
Ng et al., "Highly Reversible Lithium Storage in Spheroidal Carbon-Coated Silicon Nanocomposites as Anodes for Lithium-Ion Batteries", Angew. Chem. Int. Ed. 2006, 45, 6896-6899, Sep. 29, 2006.

* cited by examiner

SILICON PARTICLES FOR ANODE MATERIALS OF LITHIUM ION BATTERIES

CROSS-REFERENCE TO RELATED APPLICATIONS

This application is a U.S. National Phase Application of PCT/EP2017/052883, filed Feb. 9, 2017 the contents of which are incorporated herein by reference in their entireties for all purposes.

FIELD OF THE INVENTION

The invention relates to spherical, non-porous, microscale silicon particles, methods for producing same and use of same in anode materials for lithium-ion batteries.

BACKGROUND OF THE INVENTION

Among the commercially available electrochemical energy storage means, rechargeable lithium-ion batteries currently have the highest specific energy at up to 250 Wh/kg. They are used primarily in the field of portable electronics, for tools and also for means of transport, such as for example bicycles or automobiles. Especially for use in automobiles, however, it is necessary to further considerably increase the energy density of the batteries, in order to achieve greater ranges of the vehicles.

In practice, graphitic carbon in particular is used at present as the negative electrode material ("anode"). The relatively low electrochemical capacity thereof of a theoretical 372 mAh/g is disadvantageous, corresponding to only approximately one-tenth of the electrochemical capacity theoretically achievable with lithium metal. In contrast, silicon has the highest known storage capacity for lithium ions at 4199 mAh/g. Silicon-containing electrode active materials disadvantageously suffer from extreme changes in volume of up to around 300% on charging or discharging with lithium. As a result of this volume change, there is great mechanical stress on the active material and on the whole electrode structure which, as a result of electrochemical grinding, leads to a loss of electrical contacting and therefore to destruction of the electrode with loss of capacity. Furthermore, the surface of the silicon anode material employed reacts with constituents of the electrolyte with the continuous formation of passivating protective layers (solid electrolyte interphase; SEI), leading to an irreversible loss of mobile lithium.

In order to increase the cycling stability of lithium-ion batteries comprising silicon particles, US2004214085 recommends employing porous silicon particles in anode materials. The pores are intended to suppress electrochemical grinding and pulverization of the active material during cycling of the batteries. The porous silicon particles are produced in accordance with US2004214085 by converting a melt based on silicon and further metals into particles by means of atomization, from which the further metals are subsequently etched out using acids, as a result of which pores are formed in the silicon particles.

U.S. Pat. No. 7,097,688 is concerned in general with the production of spherical, coarse particles based on silicon-containing alloys and aims here for an improvement in atomization methods. Therein, melts of the alloys were atomized in a spray chamber and subsequently cooled to obtain the particles. The particles have diameters of 5 to 500 mesh, that is to say of 31 to 4000 µm. Specifically described are particles of an Si—Fe alloy having an average particle size of 300 µm. JP10182125 is concerned with the provision of high-purity silicon powder (6N quality; 99.9999% purity) for solar cell production. To this end, molten silicon was converted by means of spraying methods into droplets which were then cooled in water, which gave silicon particles having particle sizes of for example 0.5 to 1 mm. JP2005219971 discloses plasma methods for obtaining spherical silicon particles. No details on the size of the product particles can be found in JP2005219971. Solar cells are also mentioned as a field of use for the silicon particles. US2004004301 describes plasma rounding of silicon particles with subsequent removal of SiO from the particle surface by alkaline etching. 100 µm are specified as average particle size and possible applications mentioned are solar cells, semiconductors, rocket propellants and nuclear fuels.

The patent application having application number DE 102015215415.7 describes the use of silicon particles in lithium-ion batteries. Gas-phase deposition methods and grinding processes are mentioned as methods for producing such particles. Grinding processes inevitably lead to products in chip form. Microscale products of gas-phase deposition methods are inevitably in the form of aggregates and are thus also not spherical. Microscale silicon particles are not obtainable economically using gas-phase deposition methods.

In the light of this background, the object was to provide effective, cheaply available anode active materials for lithium-ion batteries that enable lithium-ion batteries having high cycling stability and minimum SEI formation.

BRIEF SUMMARY OF THE INVENTION

The invention provides spherical, non-porous silicon particles having average particle sizes ($d_{50}$) of 1 to 10 µm and a silicon content of 97% to 99.8% by weight, wherein the silicon content is based on the total weight of the silicon particles minus any oxygen contents.

The invention further provides methods for producing the silicon particles of the invention by atomizing silicon.

The invention further provides alternative methods for producing the silicon particles of the invention by means of plasma rounding of silicon particles.

The invention further provides spherical, non-porous silicon particles obtainable by the methods of the invention.

The silicon used in the methods of the invention is also referred to below as silicon starting material.

DETAILED DESCRIPTION OF PREFERRED EMBODIMENTS

The silicon starting material has a silicon content of preferably 97% to 99.8% by weight, particularly preferably 97.5% to 99.5% by weight and most preferably 98% to 99.0% by weight, wherein the silicon content is based on the total weight of the silicon particles minus any oxygen contents. Any oxygen content in the silicon particles may for example depend on how the silicon particles are stored, which is not fundamental for the present invention. Accordingly, any oxygen present in the silicon particles is not taken into account in the specification according to the invention of the silicon content. Subtracting the oxygen content in the silicon particles from the total weight of the silicon particles gives the weight on which the specification according to the invention of the silicon content is based. The silicon content and the oxygen content are determined via elemental analyses, as indicated further down in the description of the examples.

The silicon starting material may be in elemental form, in the form of binary, ternary or multinary silicon/metal alloys (with, for example, Li, Na, K, Sn, Ca, Co, Ni, Cu, Cr, Ti, Al, Fe). The silicon starting material may optionally comprise silicon oxide. Elemental silicon is preferred, in particular since this has an advantageously high storage capacity for lithium ions.

Metals, especially alkaline earth metals such as calcium, are present in the silicon starting material to an extent of preferably ≤1% by weight, particularly preferably 0.01% to 1% by weight and most preferably 0.015% to 0.5% by weight, based on the total weight of the silicon. Higher contents, for example of alkaline earth metals when processing the silicon particles to give anode inks, can lead, in particular in aqueous systems, to a shift in the pH of the inks into the alkaline, which by way of example promotes the corrosion of silicon and is undesirable.

Elemental silicon comprises, for example, polysilicon that contains foreign atoms (such as for example B, P, As), silicon doped specifically with foreign atoms (such as for example B, P, As), especially silicon from metallurgical processing, which may comprise elemental contamination (such as for example Fe, Al, Cu, Zr, C).

Particular preference is given to silicon from metallurgical processing.

If the silicon starting material has been alloyed with an alkali metal M, the stoichiometry of the alloy $M_ySi$ is then preferably in the range $0<y<5$. The silicon particles may optionally have been pre-lithiated. If the silicon particles have been alloyed with lithium, the stoichiometry of the alloy $Li_zSi$ is preferably in the range $0<z<2.2$.

If the silicon starting material comprises silicon oxide, the stoichiometry of the oxide $SiO_x$ is preferably in the range $0<x<1.3$. If a silicon oxide having higher stoichiometry is present, it is preferably located on the surface of silicon particles, preferably with layer thicknesses of less than 10 nm.

The silicon starting material can be provided by conventional methods, such as gas phase deposition methods or preferably grinding processes, as described, for example, in the patent application having application number DE 102015215415.7. Suitable grinding processes are by way of example wet or in particular dry grinding processes. In this case, use is preferably made of planetary ball mills, jet mills, such as opposed jet or impact mills, or stirred ball mills.

For the atomizing process, the term atomization or micronization is also commonly used.

In the atomizing process of the invention, in general, silicon is melted or silicon is employed in the form of a melt, the molten silicon is formed into droplets, and cooling of the droplets to a temperature below the melting point yields the silicon particles of the invention. The melting point of silicon is in the region of 1410° C.

For the atomizing process, the silicon is preferably employed as a solid. The silicon starting material can take any desired forms, and may for example be splintery or coarse. As an alternative, the silicon may also be employed as a melt. Such a melt preferably originates from the metallurgical production of silicon.

Atomizing processes used may for example be centrifugal, gas or liquid atomizing processes, especially water atomizing processes. Standard atomization apparatuses may be used.

An atomization apparatus preferably comprises an oven, especially an induction oven; optionally an intermediate container; an atomization chamber; a collector; and optionally one or more further units, for example a separation unit, a drying unit and/or a classification unit.

In order to perform the atomizing process, the silicon starting material is preferably introduced into the oven and melted therein. The molten silicon has temperatures of, for example, 1500 to 1650° C. The molten silicon can be supplied from the oven directly to the atomization chamber; as an alternative, the molten silicon can also be introduced from the oven into an intermediate container, for example into a collecting container, and supplied from the latter to the atomization chamber. The molten silicon is usually introduced into the atomization chamber through one or more nozzles, generally in the form of a jet. The nozzles have diameters of preferably 1 to 10 mm.

In the case of gas or liquid atomizing processes, an atomizing medium is usually introduced into the atomization chamber through one or preferably two or more further nozzles.

The atomizing medium generally hits the silicon in the atomization chamber, as a result of which the molten silicon is converted into droplets. The atomizing medium may for example be supercritical fluids, gases, for example noble gases, especially argon, or preferably liquids such as water or organic solvents such as hydrocarbons or alcohols, especially hexane, heptane, toluene, methanol, ethanol or propanol. Water is a preferred atomizing medium. The atomizing medium is generally introduced into the atomization chamber under elevated pressure.

In the centrifugal atomizing process, the molten silicon in the atomization chamber, as usual, hits a rotating disk, as a result of which the silicon is converted into droplets.

There may be a protective gas atmosphere in the atomization chamber. Examples of protective gases are noble gases, especially argon. The pressure in the atomization chamber is by way of example in the range of 50 mbar to 1.5 bar.

The silicon can be supplied to a collector by means of the protective gas stream, the atomizing medium stream or the force of gravity. The collector may be a separate unit or an integral constituent part of the atomization chamber; for example it can form the bottom of the atomization chamber.

The solidification of the molten silicon in droplet form customarily starts or takes place in the atomization chamber. Cooling of the molten silicon can be effected during contact with the atomizing medium and/or during the further residence time in the atomization chamber and/or in the collector. The collector may contain a cooling medium, for example water. The cooling medium may correspond to the atomizing medium in terms of its composition. The cooling medium has a pH of preferably 1 to 8, particularly preferably 1 to 7.5 and even more preferably 2 to 7.

The silicon particles can be removed from the collector, optionally together with cooling medium and any atomizing media, especially liquid atomizing media. When using cooling media and/or liquid atomizing media, sedimentation may already occur in the collector. To separate off cooling media and/or liquid atomizing media, the mixture with the silicon particles can be transferred from the collector into a separating unit. In the separating unit, the silicon particles can be separated from the cooling medium and/or liquid atomizing media by way of example by screening, filtration, sedimentation or centrifugation. The silicon particles thus obtained can optionally be subjected to further aftertreatments, such as for example drying, classification or surface treatment.

In this way, silicon of the invention can be obtained in the form of particles of the invention. The particle size can be influenced in a customary manner per se, for example, via the diameter of the nozzles, in particular via the nature and the pressure of the atomizing medium or via the contact angle between the jets of the silicon and of the atomizing medium. Such settings are apparatus-dependent and can be ascertained using a few exploratory tests.

By means of the plasma rounding, silicon particles in any form can be converted into spherical particles of the invention. To this end, in general, silicon particles are fully or preferably partially melted by means of plasma irradiation, with non-round silicon particles being converted into a spherical shape. Cooling to a temperature below the melting point of silicon leads to the spherical silicon particles of the invention.

The silicon starting material for the plasma rounding may be, for example, splintered or angular silicon particles, especially silicon particles in the form of cubes, prisms, blades, plates, flakes, cylinders, rods, fibers or filaments. Mixtures of silicon particles of different forms can also be employed. In general, the silicon starting material is therefore present at most in part, if at all, in the form of round or spherical particles.

The silicon starting material particles can be introduced in a conventional manner into a plasma reactor. In the plasma reactor, the silicon particles are generally heated by plasma. In the process, the surface of the silicon particles is in general at least partially, preferably completely, melted. The individual silicon particles preferably melt in a proportion of at least 10% by weight, particularly preferably at least 50% by weight. The silicon particles preferably do not melt completely. In the plasma reactor, the silicon is generally in the form of particles or partially melted droplets of silicon.

The atmosphere in the plasma reactor preferably contains inert gases, especially noble gases, such as argon, and possibly reducing gases such as hydrogen. The temperatures in the plasma reactor are in the range from preferably 12 000 to 20 000° C. The pressure in the plasma reactor may for example be in the range from 10 mbar to 1.5 bar. The standard plasma reactors can be employed, for example plasma reactors that are sold under the Teksphero trade name by Tekna.

The particles thus treated can subsequently be cooled and solidified. Spherical silicon silicon particles become obtainable in this manner. For solidification, the silicon particles are generally transferred into a cooling zone of the plasma reactor or transferred from the plasma reactor into a cooling chamber. The cooling chamber preferably contains the same atmosphere as the plasma reactor. The cooling can be effected, for example, at room temperature. There is a pressure of, for example, 10 mbar to 1.5 bar in the cooling chamber.

The particle size of the silicon particles obtained by plasma rounding is essentially determined by the particle size of the silicon starting material employed. The rounding can be controlled via the degree of melting of the silicon particles, that is to say via the extent to which silicon starting material is melted. The degree of melting can be influenced via the residence time of the silicon particles in the plasma reactor. For silicon particles that are larger and/or are to be rounded to a greater extent, a longer residence time is helpful. The residence time that is suitable for the particular case can be ascertained using a few exploratory tests.

The silicon particles of the invention are spherical. This does not, however, require the silicon particles to assume a perfect spherical geometry. Individual segments of the surface of the silicon particles of the invention may also deviate from the spherical geometry. The silicon particles can also, for example, assume ellipsoidal shapes. In general, the silicon particles are not splintery. The surface of the silicon particles is preferably not angular. In general, the silicon particles do not assume any cube, prism, blade, plate, flake, cylinder, rod, fiber or filament shape.

The spherical geometry of the silicon particles of the invention can be visualized, for example, using SEM images (scanning electron microscopy), especially using SEM images of ion beam slope sections through bodies or coatings comprising silicon particles of the invention, by way of example through electrodes comprising silicon particles of the invention, as shown for example by FIG. 1.

The spherical geometry of the silicon particles of the invention can also be quantified using such SEM images, by way of example through the orthogonal axial ratio R of a silicon particle of the invention. The orthogonal axial ratio R of a silicon particle of the invention is the quotient of the two largest mutually orthogonal diameters through a silicon particle, with the larger diameter forming the denominator and the smaller diameter forming the numerator of the quotient (determination method: SEM image). If both diameters are identical, the orthogonal axial ratio R is thus equal to 1.

The orthogonal axial ratio R of a silicon particle of the invention is preferably the quotient of the largest diameter and the longest diameter orthogonal thereto through a silicon particle, with the larger diameter forming the denominator and the smaller diameter forming the numerator of the quotient (determination method: SEM image).

The particles of the invention have an orthogonal axial ratio R of preferably $\geq 0.60$, more preferably $\geq 0.70$, even more preferably $\geq 0.80$, particularly preferably $\geq 0.85$, even more preferably $\geq 0.90$ and most preferably $\geq 0.92$. The orthogonal axial ratio R is, by way of example, $\leq 1.00$, optionally $\leq 0.99$ or $\leq 0.98$. The abovementioned orthogonal axial ratios R are preferably satisfied by $\geq 80\%$, particularly preferably $\geq 85\%$ and most preferably $\geq 90\%$ or by $\leq 99\%$ of the total number of silicon particles.

Preferably, $\leq 10\%$ of the silicon particles have an orthogonal axial ratio R of $<0.60$, especially of $\leq 0.50$.

The silicon particles have average orthogonal axial ratios R of preferably $\geq 0.60$, more preferably $\geq 0.70$, even more preferably $\geq 0.80$, particularly preferably $\geq 0.85$. The average orthogonal axial ratios R may also be $\leq 1.00$ or $\leq 0.99$. What is meant here is the arithmetic mean.

The international standard of the "Federation Europeenne de la Manutention" gives an overview in FEM 2.581 of the aspects under which a bulk product is to be considered. In the standard FEM 2.582, the general and specific bulk product properties are defined with regard to the classification. Parameters that describe the consistency and state of the product are for example particle shape and particle size distribution (FEM 2.581/FEM 2.582: General characteristics of bulk products with regard to their classification and their symbolization).

According to DIN ISO 3435, bulk products can be subdivided into 6 different particle shapes depending on the nature of the particle edges:

I: sharp edges with approximately equal extents in the three dimensions (example: cube);

II: sharp edges of which one is considerably longer than the other two (examples: prism, blade);

III: sharp edges of which one is considerably shorter than the other two (examples: plate, flake);

IV: round edges with approximately equal extents in the three dimensions (example: sphere);

V: round edges, considerably longer in one direction than in the other two (examples: cylinder, rod);

VI: fibrous, in filament form, in lock form, interlooping.

According to this classification of bulk products, the silicon particles of the invention are typically particles of particle shape IV.

The silicon particles of the invention are non-porous.

The silicon particles of the invention have a porosity of preferably ≤1 ml/g, particularly preferably ≤0.5 ml/g and most preferably ≤0.01 ml/g (determination method: BJH method according to DIN 66134). The porosity refers to, for example, the particulate cavity volume of the silicon particles of the invention.

The pores of the silicon particles have diameters of preferably <2 nm (determination method: BJH pore size distribution (gas adsorption) according to DIN 66134).

The BET surface areas of the silicon particles of the invention are preferably 0.01 to 30.0 m$^2$/g, more preferably 0.1 to 25.0 m$^2$/g, particularly preferably 0.2 to 20.0 m$^2$/g and most preferably 0.2 to 18.0 m$^2$/g. The BET surface area is determined according to DIN 66131 (using nitrogen).

The silicon particles of the invention have a density of preferably 2.0 to 2.6 g/cm$^3$, particularly preferably 2.2 to 2.4 g/cm$^3$ and most preferably 2.30 to 2.34 g/cm$^3$ (determination method: He pycnometry according to DIN 66137-2).

The silicon particles of the invention have volume-weighted particle size distributions having diameter percentiles $d_{50}$ of preferably ≥2 µm, particularly preferably ≥3 µm and most preferably ≥4 µm. The silicon particles of the invention have $d_{50}$ values of preferably ≤8 µm, particularly preferably ≤6 µm and most preferably ≤5 µm. The volume-weighted particle size distribution of the silicon particles was determined by static laser scattering using the Mie model with the Horiba LA 950 measuring instrument with ethanol or water as the dispersing medium for the silicon particles.

The statements made above with regard to the silicon starting material apply to the silicon particles of the invention in respect of the chemical composition. In particular, the silicon particles have a silicon content of preferably 97% to 99.8% by weight, particularly preferably 97.5% to 99.5% by weight and most preferably 98% to 99.0% by weight, with the silicon content being based on the total weight of the silicon particles minus any oxygen contents. The silicon particles comprise metals, especially alkaline earth metals such as calcium, to an extent of preferably ≤1% by weight, particularly preferably 0.01% to 1% by weight and most preferably 0.015% to 0.5% by weight, based on the total weight of the silicon. The silicon particles may optionally contain oxygen, especially in the form of a silicon oxide. The proportion of oxygen is preferably 0.05% to 1% by weight, particularly preferably 0.1% to 0.8% by weight and most preferably 0.15% to 0.6% by weight, based on the total weight of the silicon particles.

In general, no metal or no SiO$_x$, preferably no Sn, Al, Pb, In, Ni, Co, Ag, Mn, Cu, Ge, Cr, Ti, Fe, and especially no Ca, is etched out of the silicon particles of the invention that are obtained by the methods of the invention.

The silicon particles obtained by the methods of the invention are preferably employed directly, that is to say without any further processing step, for producing lithium-ion batteries, especially for producing anode inks. As an alternative, one or more aftertreatment steps can be conducted, such as for example a carbon coating, a polymer coating or an oxidative treatment of the silicon particles.

Carbon-coated silicon particles are obtainable, for example, by coating the silicon particles of the invention with one or more carbon precursors and subsequently carbonizing the coated product thus obtained, with the carbon precursors being converted into carbon. Examples of carbon precursors are carbohydrates and especially polyaromatic hydrocarbons, pitches and polyacrylonitrile. As an alternative, carbon-coated silicon particles are also obtainable by coating silicon particles of the invention with carbon by CVD methods (chemical vapor deposition) using one or more carbon precursors. Carbon precursors are, for example, hydrocarbons having 1 to 10 carbon atoms, such as methane, ethane and especially ethylene, acetylene, benzene or toluene. The carbon-coated silicon particles are preferably based on carbon to an extent of ≤20% by weight, particularly preferably 0.1% to 10% by weight and most preferably 0.5% to 5% by weight, based on the total weight of the carbon-coated silicon particles. The carbon-coated silicon particles can be produced, for example, in the manner described in the patent application having application number DE 102016202459.0.

The silicon particles of the invention are suitable, for example, as silicon-based active materials for anode active materials for lithium-ion batteries.

The invention further provides anode materials for lithium-ion batteries comprising one or more binders, optionally graphite, optionally one or more further electrically conductive components and optionally one or more additives, characterized in that one or more silicon particles of the invention are present.

Preferred formulations for the anode material of the lithium-ion batteries comprise preferably 5% to 95% by weight, especially 60% to 85% by weight, of silicon particles of the invention; 0 to 40% by weight, especially 0 to 20% by weight, of further electrically conductive components; 0 to 80% by weight, especially 5% to 30% by weight, of graphite; 0 to 25% by weight, especially 5% to 15% by weight, of binders; and optionally 0 to 80% by weight, especially 0.1% to 5% by weight, of additives; where the figures in % by weight are based on the total weight of the anode material and the proportions of all constituents of the anode material add up to 100% by weight.

In one preferred formulation for the anode material, the proportion of graphite particles and further electrically conductive components is in total at least 10% by weight, based on the total weight of the anode material.

The invention further provides lithium-ion batteries comprising a cathode, an anode, a separator and an electrolyte, characterized in that the anode is based on the abovementioned anode material of the invention.

Besides the silicon particles of the invention, the anode materials and lithium-ion batteries of the invention can be produced using the standard starting materials for this purpose, and use may be made of the methods customary for this purpose for producing the anode materials and lithium-ion batteries, as described, for example, in the patent application having application number DE 102015215415.7.

The invention further provides lithium-ion batteries comprising a cathode, an anode, a separator and an electrolyte, characterized in that the anode is based on the abovementioned anode material of the invention; and the anode material of the fully charged lithium-ion battery is only partially lithiated.

The present invention further provides methods for charging lithium-ion batteries comprising a cathode, an anode, a separator and an electrolyte, characterized in that the anode is based on the abovementioned anode material of the invention; and the anode material is only partially lithiated when fully charging the lithium-ion battery.

The invention further provides for the use of the anode materials of the invention in lithium-ion batteries which are configured such that the anode materials in the fully charged state of the lithium-ion batteries are only partially lithiated.

It is thus preferable for the anode material, especially the carbon-coated silicon particles of the invention, to be only partially lithiated in the fully charged lithium-ion battery. "Fully charged" refers to the state of the battery in which the anode material of the battery exhibits its highest loading of lithium. Partial lithiation of the anode material means that the maximum lithium absorption capacity of the silicon particles in the anode material is not exhausted. The maximum lithium absorption capacity of the silicon particles generally corresponds to the formula $Li_{4.4}Si$ and is thus 4.4 lithium atoms per silicon atom. This corresponds to a maximum specific capacity of 4200 mAh per gram of silicon.

The ratio of the lithium atoms to the silicon atoms in the anode of a lithium-ion battery (Li/Si ratio) can be adjusted by way of example via the flow of electric charge. The degree of lithiation of the anode material or of the silicon particles present in the anode material is proportional to the electric charge that has flowed. In this variant, the capacity of the anode material for lithium is not completely exhausted during the charging of the lithium-ion battery. This results in partial lithiation of the anode.

In an alternative, preferred variant, the Li/Si ratio of a lithium-ion battery is adjusted by the cell balancing. In this case, the lithium-ion batteries are designed such that the lithium absorption capacity of the anode is preferably greater than the lithium release capacity of the cathode. The effect of this is that the lithium absorption capacity of the anode is not fully exhausted in the fully charged battery, that is to say that the anode material is only partially lithiated.

In the case of the partial lithiation according to the invention, the Li/Si ratio in the anode material in the fully charged state of the lithium-ion battery is preferably ≤2.2, particularly preferably ≤1.98 and most preferably ≤1.76. The Li/Si ratio in the anode material in the fully charged state of the lithium-ion battery is preferably ≥0.22, particularly preferably ≥0.44 and most preferably ≥0.66.

The anode is charged with preferably ≤1500 mAh/g, particularly preferably ≤1400 mAh/g and most preferably ≤1300 mAh/g, based on the mass of the anode. The anode is preferably charged with at least 600 mAh/g, particularly preferably ≥700 mAh/g and most preferably ≥800 mAh/g, based on the mass of the anode. These figures are preferably based on the fully charged lithium-ion battery.

The capacity of the silicon of the anode material of the lithium-ion battery is preferably utilized to an extent of ≤50%, particularly preferably to an extent of ≤45% and most preferably to an extent of ≤40%, based on a capacity of 4200 mAh per gram of silicon.

The degree of lithiation of silicon or the utilization of the capacity of silicon for lithium (Si capacity utilization α) can be determined, for example, as described in the patent application having application number DE 102015215415.7 at page 11, line 4 to page 12, line 25, especially on the basis of the formula stated there for the Si capacity utilization α and the supplementary details under the headings "Bestimmung der Delithiierungs-Kapazität β" [Determination of the delithiation capacity β] and "Bestimmung des Si-Gewichtsanteils $ω_{si}$" [Determination of the proportion by weight of Si $ω_{si}$] ("incorporated by reference").

The use of the silicon particles of the invention in lithium-ion batteries surprisingly leads to an improvement in the cycling performance thereof. Such lithium-ion batteries have a low irreversible loss of capacity in the first charging cycle and stable electrochemical performance with only slight fading in subsequent cycles. The silicon particles of the invention thus permit achievement of a low initial loss of capacity and additionally a low continuous loss of capacity of the lithium-ion batteries. Overall, the lithium-ion batteries of the invention have very good stability. This means that, even with a multiplicity of cycles, barely any fatigue phenomena occur, such as for example as a result of mechanical destruction of the anode material of the invention or SEI.

Moreover, the silicon particles of the invention are surprisingly stable in water, especially in aqueous ink formulations for anodes of lithium-ion batteries, with the result that there are no problems as a result of evolution of hydrogen. This allows processing without foaming of the aqueous ink formulation and the production of particularly homogeneous or gas-bubble-free anodes.

Silicon of limited purity has proven to be suitable for anode active material of lithium-ion batteries with advantageous cycling performance. Laborious purification methods for producing high-purity silicon can therefore be dispensed with. The silicon particles of the invention are thus obtainable in an inexpensive manner.

The inventive configurations of the silicon particles interact synergistically to achieve these effects.

The examples which follow serve to further illustrate the invention.

Determination of the Particle Sizes

The particle distribution was measured by means of static laser scattering using the Mie model with a Horiba LA 950 in a highly dilute suspension in water or ethanol. The average particle sizes given are volume-weighted.

Elemental Analysis

The O content was determined on a Leco TCH-600 analyzer. The further element contents given (such as Si, Ca, Al, Fe) were determined, after digestion of the Si particles, using ICP (inductively coupled plasma) emission spectroscopy on an Optima 7300 DV (Perkin Elmer) which was equipped with Dual View technology.

Determination of the BJH Pore Volume

Pore analysis was conducted per the method of Barett, Joyner and Halenda (BJH, 1951) in accordance with DIN 66134. The data of the desorption isotherm were used for the evaluation. The result in volume per gram gives the cavity volume of the pores and can thus be considered to be particulate porosity.

Determination of the Orthogonal Axial Ratio R

The orthogonal axial ratio R of Si particles was ascertained using SEM images of cross sections through electrodes comprising Si particles.

The orthogonal axial ratio R of an Si particle is the quotient of the two largest mutually orthogonal diameters through an Si particle, with the larger diameter forming the denominator and the smaller diameter forming the numerator of the quotient (determination method: SEM image). If both diameters are identical, the orthogonal axial ratio R is equal to 1.

EXAMPLE 1: PRODUCTION OF Si PARTICLES BY ATOMIZATION

The silicon powder was obtained according to the prior art by atomizing an Si melt having a purity of Si of 98.5% (metallurgical Si).

Particle size distribution of the silicon particles thus obtained (determined with water as dispersant): d10=2.7 μm, d50=4.5 μm, d90=7.1 μm, (d90−d10)=4.4 μm.

Pore volume (BJH measurement): <0.01 cm$^3$/g.

Elemental composition: O 0.45%; Si 97.9%, Ca 52 ppm; Al 0.12%, Fe 0.47%.

Orthogonal axial ratio R: average: 0.86; 8% of the Si particles have an R value of less than or equal to 0.60; 80% of the particles have an R value of greater than 0.80.

EXAMPLE 2: ANODE HAVING THE Si PARTICLES FROM EXAMPLE 1

29.71 g of polyacrylic acid (Sigma-Aldrich) dried to constant weight at 85° C. and 756.60 g of deionized water were agitated by means of a shaker (290 l/min) for 2.5 h until complete dissolution of the polyacrylic acid. Lithium hydroxide monohydrate (Sigma-Aldrich) was added to the solution in portions until the pH was 7.0 (measured using a WTW pH 340i pH meter and SenTix RJD probe). The solution was subsequently thoroughly mixed by means of a shaker for a further 4 h.

To 12.50 g of the neutralized polyacrylic acid solution were added 7.00 g of the silicon particles from example 1 and 5.10 g of deionized water and dispersed by means of a dissolver at a circumferential speed of 4.5 m/s for 5 min and of 12 m/s for 30 min with cooling at 20° C. After adding 2.50 g of graphite (Imerys, KS6L C), stirring was performed for a further 30 min at a circumferential speed of 12 m/s.

After degassing, the dispersion was applied by means of a film applicator frame having a 0.08 mm gap height (Erichsen, Model 360) to a copper foil having a thickness of 0.030 mm (Schlenk Metallfolien, SE-Cu58). The anode coating thus produced was subsequently dried for 60 min at 80° C. and air pressure 1 bar. The average basis weight of the dry anode coating thus obtained was 2.88 mg/cm$^2$ and the coating density was 1.06 g/cm$^3$.

FIG. 1 shows an SEM image of the ion beam slope section of the anode coating from example 2.

EXAMPLE 3

Lithium-ion battery having the anode from example 2:

The electrochemical studies were conducted on a button cell (CR2032 type, Hohsen Corp.) in a 2-electrode arrangement. The electrode coating from example 2 was employed as counter-electrode or negative electrode (Dm=15 mm); a coating based on lithium/nickel/manganese/cobalt oxide 6:2:2 having a content of 94.0% and average basis weight of 14.8 mg/cm$^2$ was used as working electrode or positive electrode (Dm=15 mm). A glass-fiber filter paper (Whatman, GD Type D) soaked with 60 μl of electrolyte served as separator (Dm=16 mm). The electrolyte used was composed of a 1.0 molar solution of lithium hexafluorophosphate in a 2:8 (v/v) mixture of fluoroethylene carbonate and diethyl carbonate. The cell was constructed in a glovebox (<1 ppm H$_2$O, O$_2$); the water content in the dry mass of all components used was below 20 ppm.

The electrochemical testing was conducted at 20° C. The cell was charged by the cc/cv (constant current/constant voltage) method with a constant current of 5 mA/g (corresponding to C/25) in the first cycle and of 60 mA/g (corresponding to C/2) in the subsequent cycles and, after reaching the voltage limit of 4.2 V, with constant voltage until the current fell below 1.2 mA/g (corresponding to C/100) or 15 mA/g (corresponding to C/8). The cell was discharged by the cc (constant current) method with a constant current of 5 mA/g (corresponding to C/25) in the first cycle and of 60 mA/g (corresponding to C/2) in subsequent cycles until the voltage limit of 3.0 V was reached. The selected specific current was based on the weight of the coating of the positive electrode.

On account of the formulation, the lithium-ion battery was operated by means of cell balancing with partial lithiation. The test results are summarized in table 1.

COMPARATIVE EXAMPLE 4

Anode having splintery silicon particles with d50=0.8 μm and 99.9% purity:

A dispersion of splintery, non-porous silicon particles (silicon content: 99.9% (solar grade Si); d50=0.80 μm) in ethanol was produced by means of wet grinding (solids content: 21.8%). After centrifugation, ethanol was separated off.

Orthogonal axial ratio R of the silicon particles:

Average: 0.47; 88% of the Si particles have an R value of less than or equal to 0.60; 4% of the particles have an R value of greater than 0.80.

The silicon particles were dispersed in water (solids content: 14.4%). 12.5 g of the aqueous dispersion were added to 0.372 g of a 35% by weight aqueous solution of polyacrylic acid (Sigma-Aldrich) and 0.056 g of lithium hydroxide monohydrate (Sigma-Aldrich) and dispersed by means of a dissolver at a circumferential speed of 4.5 m/s for 5 min and of 17 m/s for 30 min with cooling at 20° C. After adding 0.645 g of graphite (Imerys, KS6L C), stirring was performed for a further 30 min at a circumferential speed of 12 m/s.

After degassing, the dispersion was applied by means of a film applicator frame having a 0.12 mm gap height (Erichsen, Model 360) to a copper foil having a thickness of 0.030 mm (Schlenk Metallfolien, SE-Cu58). The anode coating thus produced was subsequently dried for 60 min at 80° C. and air pressure 1 bar. The average basis weight of the dry anode coating was 2.73 mg/cm$^2$ and the coating density was 0.84 g/cm$^2$.

Figure 2:
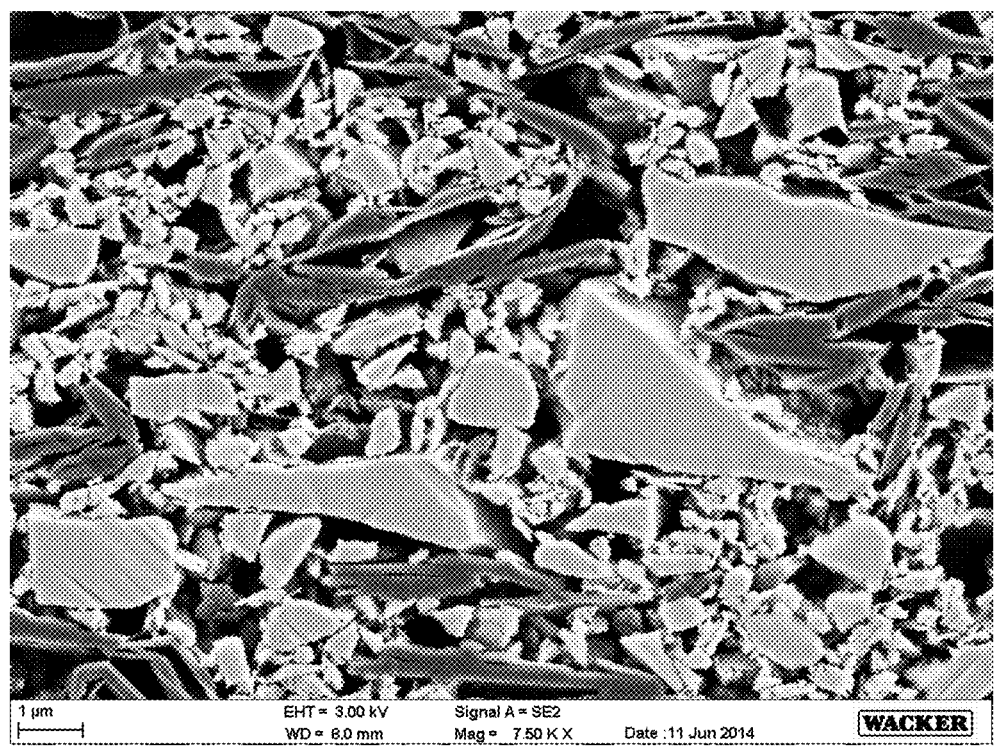

FIG. 2 shows an SEM image of the ion beam slope section of the anode coating from comparative example 4.

COMPARATIVE EXAMPLE 5

Lithium-ion battery having the anode from example 4:

The anode from example 4 was tested as described in example 3, except using as electrolyte (120 μl) a 1.0 molar solution of lithium hexafluorophosphate in a 3:7 (v/v) mixture of fluoroethylene carbonate and ethyl methyl carbonate, which was admixed with 2.0% by weight of vinylene carbonate.

On account of the formulation, the lithium-ion battery was operated by means of cell balancing with partial lithiation. The test results are summarized in table 1.

TABLE 1

Test results using the batteries of (comparative) examples 3 and 5:

| (C.) ex. | Silicon particles | Discharge capacity after cycle 1 [mAh/cm$^2$] | Number of cycles with ≥80% retention of capacity |
|---|---|---|---|
| 3 | Ex. 1 | 2.00 | 161 |
| 5 | C. ex. 4 | 1.97 | 100 |

The invention claimed is:

1. Anode materials for lithium-ion batteries comprising:
one or more binders,
optionally graphite,
optionally one or more further electrically conductive components,
optionally one or more additives, and
non-aggregated, spherical, non-porous silicon particles having average particle sizes of 1 to 10 μm and a silicon content of 97% to 99.8% by weight, wherein the silicon content is based on the total weight of the silicon particles minus any oxygen contents, the silicon is in elemental form, and wherein ≥80% of the silicon particles have an orthogonal axial ratio R of 0.60≤R≤1.0, wherein the orthogonal axial ratio R is the quotient of the two largest mutually orthogonal diameters through a silicon particle and the larger diameter forms the denominator and the smaller diameter forms the numerator of the quotient, as determined by SEM image.

2. The anode materials for lithium-ion batteries of claim 1, wherein ≥85% of the silicon particles have an orthogonal axial ratio R of 0.70≤R≤1.0, wherein the orthogonal axial ratio R is the quotient of the two largest mutually orthogonal diameters through a silicon particle and the larger diameter forms the denominator and the smaller diameter forms the numerator of the quotient, as determined by SEM image.

3. The anode materials for lithium-ion batteries of claim 1, wherein the silicon particles have an average orthogonal axial ratio R of 0.70≤R≤1.0, wherein the orthogonal axial ratio R is the quotient of the two largest mutually orthogonal diameters through a silicon particle and the larger diameter forms the denominator and the smaller diameter forms the numerator of the quotient, as determined by SEM image.

4. The anode materials for lithium-ion batteries of claim 1, wherein the silicon particles have been coated with carbon.

5. The anode materials for lithium-ion batteries of claim 1, wherein the spherical, non-porous silicon particles are obtained by atomizing silicon.

6. The anode materials for lithium-ion batteries of claim 5, wherein the spherical, non-porous silicon particles are obtained from molten silicon, by melting silicon or employing silicon in the form of a melt, forming the molten silicon into droplets, and cooling the droplets to a temperature below the melting point of silicon.

7. The anode materials for lithium-ion batteries of claim 1, wherein the spherical, non-porous silicon particles are obtained by plasma rounding of silicon particles.

8. The anode materials for lithium-ion batteries of claim 7, wherein the spherical, non-porous silicon particles are obtained by fully or partially melting silicon particles by plasma irradiation, and subsequently cooling to a temperature below the melting point of silicon.

9. The anode materials of claim 1, wherein the non-aggregated spherical, non-porous silicon particles have silicon oxide SiO$_x$ where x≥1.3 on surfaces thereof.

10. The anode materials of claim 1, wherein the non-aggregated spherical, non-porous silicon particles are coated with carbon, the content of carbon being ≤20 weight percent based on the total weight of the carbon-coated silicon particles.

11. The anode materials of claim 1, wherein the non-aggregated spherical, non-porous silicon particles have an average orthogonal axial ratio R of greater than or equal to 0.80.

12. The anode materials of claim 1, wherein the non-aggregated spherical, non-porous silicon particles have an average orthogonal axial ratio R of greater than or equal to 0.85.

13. The anode materials of claim 1, wherein non-aggregated, spherical, non-porous silicon particles are carbon-coated, wherein the carbon content is from 0.1 to 10% by weight based on the total weight of the carbon-coated particles.

14. The anode materials of claim 1, wherein non-aggregated, spherical, non-porous silicon particles are carbon-coated, wherein the carbon content is from 0.5 to 5% by weight based on the total weight of the carbon-coated particles.

15. The anode particles of claim 1, wherein the non-aggregated, spherical, non-porous silicon particles have a silicon oxide coating on surfaces thereof, having the formula SiO$_x$ where x≥1.3, and a further coating of carbon derived by carbonizing one or more carbon precursors which have been coated onto the silicon particles having a silicon oxide coating, with the proviso that the carbon precursors are converted into carbon, and the carbon content of the carbon-coated particles is ≤20 weight percent based on the total weight of the coated particles.

16. The anode material of claim 1, wherein the non-aggregated, spherical, non-porous silicon particles have no coating thereon, or which are coated with a silicon oxide coating with a layer thickness of <10 nm.

17. The anode material of claim 1, wherein the non-aggregated, spherical, non-porous particles are melt-rounded fragments of metallurgical grade silicon having a silicon content of from 98 to 99% by weight based on the total weight of said particles.

18. Lithium-ion batteries comprising:
a cathode,
an anode,
a separator, and
an electrolyte, wherein the anode is based on the anode material of claim 1.

19. The lithium-ion batteries of claim 18, wherein, in the fully charged lithium-ion battery, the ratio of lithium atoms to silicon atoms in the anode material is ≤2.2.

20. The lithium-ion batteries of claim 18, wherein the capacity of the silicon of the anode material of the lithium-ion battery is utilized to an extent of ≤50%, based on the maximum capacity of 4200 mAh per gram of silicon.

* * * * *